(12) United States Patent
Fichman et al.

(10) Patent No.: US 7,056,366 B2
(45) Date of Patent: Jun. 6, 2006

(54) METHOD AND APPARATUS FOR INCREASING THE OPERATING LIFETIME OF GAS FILTERS BY AN ACOUSTIC FIELD

(75) Inventors: Matityahu Fichman, Haifa (IL); Chaim Gutfinger, Haifa (IL); Leonid Moldavsky, Nazareth Ilit (IL); Kim Shuster, Haifa (IL)

(73) Assignee: Technion Research and Development Foundation, LTD, Haifa (IL)

( * ) Notice: Subject to any disclaimer, the term of this patent is extended or adjusted under 35 U.S.C. 154(b) by 44 days.

(21) Appl. No.: 10/460,093

(22) Filed: Jun. 12, 2003

(65) Prior Publication Data

US 2004/0069142 A1 Apr. 15, 2004

Related U.S. Application Data

(60) Provisional application No. 60/389,207, filed on Jun. 17, 2002.

(51) Int. Cl.
*B01D 29/86* (2006.01)
(52) U.S. Cl. .............................. 95/29; 55/292; 95/278; 96/389
(58) Field of Classification Search ................. 96/389, 96/FOR. 173; 95/29, 278; 55/292
See application file for complete search history.

(56) References Cited

U.S. PATENT DOCUMENTS

| 3,305,481 | A | * | 2/1967 | Peterson ..................... 210/785 |
| 4,307,964 | A | * | 12/1981 | Dudgeon et al. ............ 366/127 |
| 4,319,891 | A | * | 3/1982 | Anderson et al. ............... 95/29 |
| 4,721,395 | A | * | 1/1988 | Olsson et al. ................ 366/348 |
| 5,900,043 | A | * | 5/1999 | Grandjean et al. .............. 95/29 |
| 6,086,657 | A | * | 7/2000 | Freije .............................. 95/2 |
| 6,171,366 | B1 | * | 1/2001 | Vicard et al. .................... 95/1 |
| 6,213,311 | B1 | * | 4/2001 | Coric ........................... 210/384 |
| 6,221,258 | B1 | * | 4/2001 | Feke et al. ................... 210/748 |
| 6,749,666 | B1 | * | 6/2004 | Meegan, Jr. .................... 95/29 |

FOREIGN PATENT DOCUMENTS

JP 55-94617 * 7/1980

* cited by examiner

*Primary Examiner*—Richard L. Chiesa
(74) *Attorney, Agent, or Firm*—Shalom Wertsberger; Saltamar Innovations

(57) ABSTRACT

A method for slowing down the increase in pressure drop across a gas filter caused by clogging as a result of a contaminant particles layer being formed on the filter. The method includes applying acoustic waves from an acoustic wave source to a gas to be filtered as it flows into the filter; thereby producing steady secondary acoustic streaming around dust particles already deposited on the filter, thus reducing pressure drop across the filter initially caused by clogging.

9 Claims, 5 Drawing Sheets

| Particle diameter (micrometers) | 0.19-0.3 | 0.3-0.5 | 0.5-1 | 1- 3 | 3-5 | >5 |
|---|---|---|---|---|---|---|
| % | 29 | 13 | 43 | 14.5 | 0.5 | 0 |

METHOD AND APPARATUS FOR INCREASING THE OPERATING LIFETIME OF GAS FILTERS BY AN ACOUSTIC FIELD

RELATED APPLICATIONS

This application claims the right of priority from U.S. provisional patent application No. 60/389,207, filed Jun. 17, 2002, which is incorporated herein by reference in its entirety.

FIELD OF THE INVENTION

The present invention relates to filtering of a gas. More specifically it relates to slowing down the increase in pressure drop across a gas filter during clogging of the filter.

BACKGROUND OF THE INVENTION

Filtration efficiency is an important characteristic of filters used to remove aerosol and dust particles from air. It is a function of several variables, such as porosity and thickness of the filter media, size of the filter elements, gas flow rate and the degree of filter loading. Changing some of the parameters of the filter in order to increase filtration efficiency is usually accompanied by an increase in pressure drop across the filter. Application of external fields, such as electrical or acoustical might enhance the filtration efficiency without change in pressure drop across the filter. The influence of acoustic fields on the filtration efficiency is well known. Several investigations have shown that an acoustic field can increase filtration efficiency.

Another important parameter is the operating lifetime of a filter. Every filter undergoes clogging with time. The captured dust builds up in a layer on the filter forming a filter cake. The layer grows with time, and so does the overall pressure drop across the filter. When the pressure drop reaches some critical value, the filter is defined as clogged, and it should either be cleaned or replaced.

The common methods of filter cleaning are, shaking the cake of the filter cloth and cleaning by air jets or by reverse flow. All these methods have their advantages and disadvantages. The shaking operation destroys the filter material requiring its frequent replacement. Jet and reverse flow cleaning add to the complexity of the device, and also consume a considerable amount of energy.

No prior art is known to us for the application of acoustic fields to increase the lifetime of gas filters.

It is an objective of the invention described herein to apply the influence of acoustic waves on the kinetics of filters to reduce clogging and increase the lifetime of a gas filter, by slowing down the increase in pressure drop across the filter caused by clogging.

BRIEF DESCRIPTION OF THE INVENTION

There is thus provided a method for slowing down the increase in pressure drop across a gas filter caused by clogging as a result of contaminant particles layer being formed on the filter, the method comprising applying acoustic waves from an acoustic wave source to a gas flowing into the filter, wherein said acoustic wave is applied such that said gas be acoustically excited as it reaches the filter.

thereby increasing the porosity of the contaminant particles layer on the filter, and reducing the pressure drop across the filter.

Furthermore, in accordance with some preferred embodiments of the present invention, the acoustic waves are of subsonic frequency.

Furthermore, in accordance with some preferred embodiments of the present invention, the acoustic waves are emitted in the frequency range of 10 Hz to 10 kHz and with acoustic pressure in the range of 90 dB to 140 dB proximally to the filter surface.

Furthermore, in accordance with some preferred embodiments of the present invention, there is provided an apparatus for slowing down the increase in pressure drop across a gas filter caused by clogging as a result of a contaminant particles layer being formed on the filter, the apparatus comprising:

an acoustic wave source positioned so as to emit acoustic waves into gas flowing towards the filter, for applying acoustic waves to the gas flowing into the filter wherein said acoustic wave is applied such that said gas be acoustically excited as it reaches the filter;

thereby increasing the porosity of the contaminant particles layer on the filter, and reducing the pressure drop across the filter.

Furthermore, in accordance with some preferred embodiments of the present invention, the acoustic wave source comprises:

an acoustic wave generator for generating acoustic waves;

an amplifier for amplifying the waves;

a loudspeaker emitting the amplified waves to the gas flowing into the filter.

Furthermore, in accordance with some preferred embodiments of the present invention, the acoustic waves are of subsonic frequency.

Furthermore, in accordance with some preferred embodiments of the present invention, the frequencies generated by the acoustic wave source are in the range of 10 Hz to 10 kHz with generated acoustic pressure in the range of 90 dB to 140 dB when measured in the vicinity of the filter.

DETAILED DESCRIPTION

The present invention provides a method and an apparatus for reducing clogging in filters used to filter gases.

Figure 1:
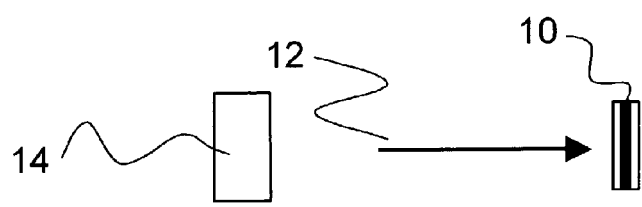
FIG. 1 is a schematic illustration of a preferred embodiment of an apparatus for increasing the lifetime of gas filters by an acoustic field.

Reference is now made to FIG. 1, which is a schematic of a preferred embodiment of an apparatus for increasing the life of gas filters by an acoustic field. Acoustical wave generator 14 is located in proximity to gas filter 10 such that waves generated by generator 14 impact on particles in gas flow 12 as they move towards and through filter 10.

The apparatus of the present invention can be used with existing filters 10 used to filter gases 12—there is no adaptation of these components for the present invention. Instead the present invention comprises the simple addition of acoustical wave generator 14 to an existing filter 10 for filtering gas 12. The invention also comprises embodiments where a filter 10 and or gas flow 12 is designed specifically to work with acoustical wave generator 14.

Acoustical wave generator 14 can be any device capable of generating acoustical waves. It is recommended to generate acoustic waves with frequencies that are less than audible frequencies so that operation of the apparatus does not create noise that disturbs people within hearing range, but the scope of the present invention is not limited to these frequencies only.

Figure 2:
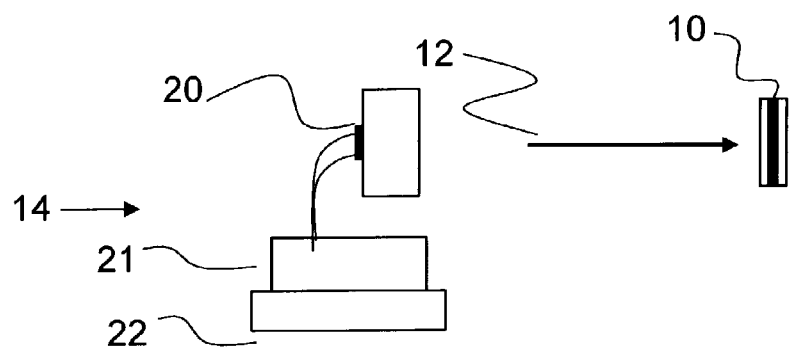
FIG. 2 is a schematic illustration of an alternative preferred embodiment of an apparatus for increasing the lifetime of gas filters by an acoustic field.

An example implementation of acoustical wave generator 14 is provided in FIG. 2, which is a schematic of a preferred embodiment of an apparatus for increasing the life of gas filters by an acoustic field. In this case, acoustical wave generator 14 comprises wave generator 22 amplified by amplifier 21 and driving loudspeaker 20.

Figures 3, 4:
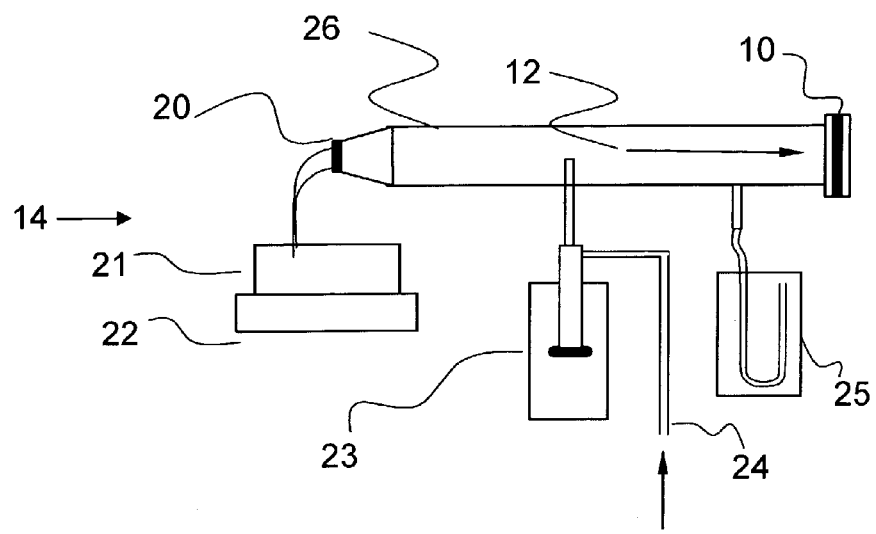
FIG. 3 is a schematic illustration of a test rig for determining the effectiveness of an apparatus for increasing the lifetime of gas filters by an acoustic field.
FIG. 4 is a table of the particle size distribution used to test the effectiveness of an apparatus for increasing the lifetime of gas filters by an acoustic field.

The effectiveness of acoustical waves in reducing pressure drop across a filter has been demonstrated using the test rig shown in FIG. 3. In the test rig, tube 26, is attached at one end to fibrous HEPA filter 10, and at the other end to acoustical wave generator 14 comprising loudspeaker 20 driven by wave generator 22 amplified by amplifier 21. Gas 12 comprising aerosol from aerosol generator 23 mixed with air from air intake 24 passes through filter 10. Pressure drop of gas 12 is measured by pressure gauge 25.

The range of frequencies used in the experiments was from 10 Hz to 10 kHz, and the acoustic pressure was varied between 90 dB to 140 dB. These values were found to be the best ranges for these parameters.

The dusty gas was generated by mixing clean air with "Arizona fine" dust after online separation of larger particles by a cyclone. The particle size distribution after the cyclone was measured by a "Climet" laser-optic counter and is given in the table in FIG. 4.

The concentration of the dust in the feed air was kept constant during the experiments at 0.5–1 g/m$^3$. The results were presented in terms of pressure drop across the filter as a function of time.

Figure 5:
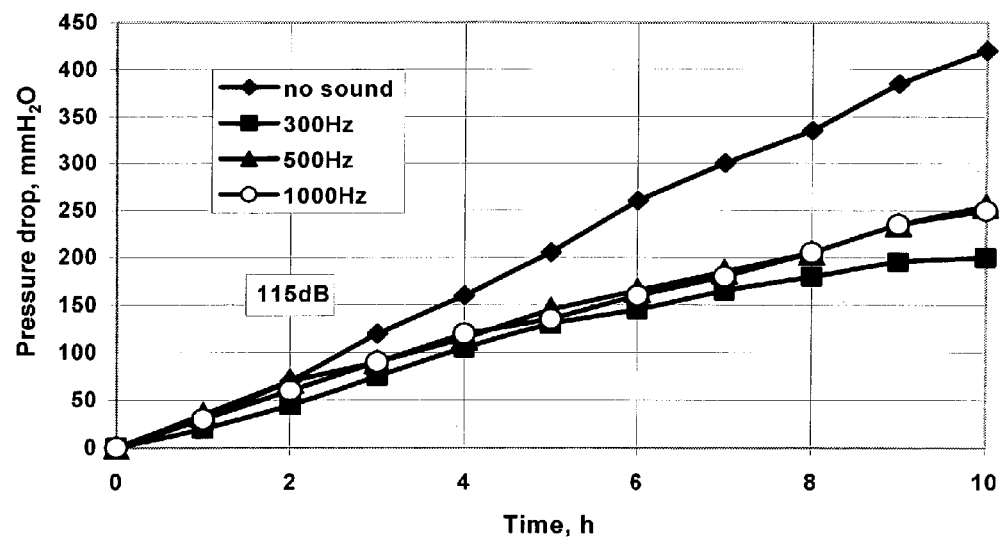
FIG. 5 is a graph of the pressure drop across a filter as a function of operating time for a sound pressure of 115 dB and different acoustic frequencies.

The results of these experiments show that the operating time of fibrous filters can be doubled by acoustics. FIG. 5 presents the pressure drop across the filter as a function of operating time for a sound pressure of 115 dB and different acoustic frequencies. Data without acoustics are plotted for comparison. As seen, the application of acoustics results in a decrease in pressure drop across the filter, and as a result, in an increase in the operating life of the filter. For example, a pressure drop of 200 mmH$_2$O is reached without acoustics after 4.9 hours of operation, whereas under the influence of a 300 Hz sound wave it is reached after 10 hours.

Figure 6:
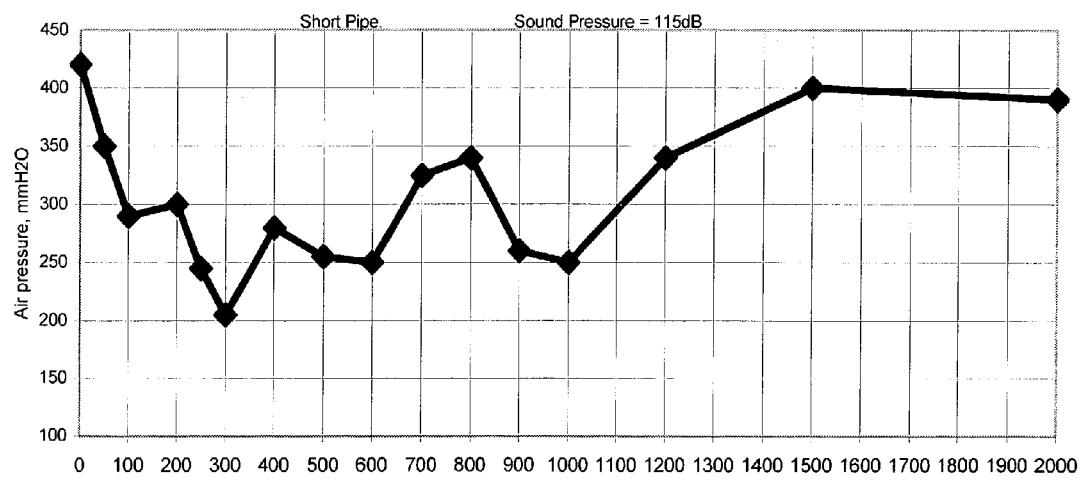
FIG. 6 is a graph of the effect of sound frequency on pressure drop after 10 hours of operation at a sound pressure of 115 dB.

FIG. 6 presents the effect of sound frequency on pressure drop after 10 hours of operation at a sound pressure of 115 dB. As seen, at frequencies below 300 Hz an increase in frequency results in a roughly linear decrease in pressure drop. Further increase in frequency doesn't seem to reduce the pressure drop further. We believe that the sound frequency has a considerable effect on the arrangement of the aerosol particles in the form of clusters on the filter surface. Photographic evidence shows that when filtration is acoustically enhanced, filter cake particles are arranged in the form of clusters.

Morphological studies performed on the filter cake indicate that the application of the acoustic field tends to increase the porosity of the cake, which results in a lower pressure drop and increased operating life of the filter.

Our filtration experiments have shown that the pressure drop measured across the filter after a given operating time is much lower for filtration in the presence of an acoustic field than without acoustics. As the total mass of the filter cake is the same for both cases, it is reasonable to assume that the porosity of the cake in the case of acoustically enhanced filtration is higher than in the case without acoustics.

In the absence of the acoustic field the buildup of the filter cake is a result of random deposition of dust particles on the filter surface, creating a dense deposit of low porosity. In case of acoustically enhanced filtration the porosity of the filter cake is higher. The reason for the higher porosity of the layer is a steady secondary acoustic streaming around each dust particle already deposited on the filter surface. The secondary streaming is a result of interaction of the acoustic waves with the solid particle.

The theoretical model for this process is as follows.

Consider a single particle of radius a on the filter surface. The flow toward it can be considered as a superposition of two flows, the main filtration flow, with a filtration velocity $U_f$, and an acoustic secondary streaming, with a streaming velocity $u_s$, generated by the acoustic waves of velocity amplitude $U_a$. Both flows are low Reynolds-number creeping flows, and a linear superposition is possible.

We simplify the problem with the aim to obtain a rough estimate of the effects of these flows on the motion of an aerosol particle toward another particle located on the filter cake, by assuming both particles to be surrounded by an infinite fluid.

The x- and y-components of the velocity around a sphere placed in an infinite fluid flowing toward it (Pnueli D. and Gutfinger C. (1997) "*Fluid Mechanics*", 482 pp., Cambridge University Press, Paperback edition) with a velocity $U_f$ are, $$u_f = U_f \left[ \frac{3}{4} \frac{ax^2}{r^3} \left( \frac{a^2}{r^2} - 1 \right) - \frac{1}{4} \frac{a}{r} \left( 3 + \frac{a^2}{r^2} \right) + 1 \right] \quad (1)$$

$$v_f = U_f \frac{3}{4} \frac{axy}{r^3} \left( \frac{a^2}{r^2} - 1 \right) \quad (2)$$

The acoustic wave with amplitude $U_a$ is described by $$u_a = U_a \cos(\omega t) \quad (3)$$

This flow generates a stationary streaming around the sphere with the velocity components in the r- and θ-direction given by $$u_{s\theta} = -\frac{45}{32} (\omega a)^{-1} U_a^2 \frac{a^4}{r^4} \sin 2\theta \quad (4)$$

$$u_{sr} = \frac{45}{32} (\omega a)^{-1} U_a^2 \frac{a^2}{r^2} \left( 1 - \frac{a^2}{r^2} \right) (3\cos^2 \theta - 1) \quad (5)$$

Figure 7:
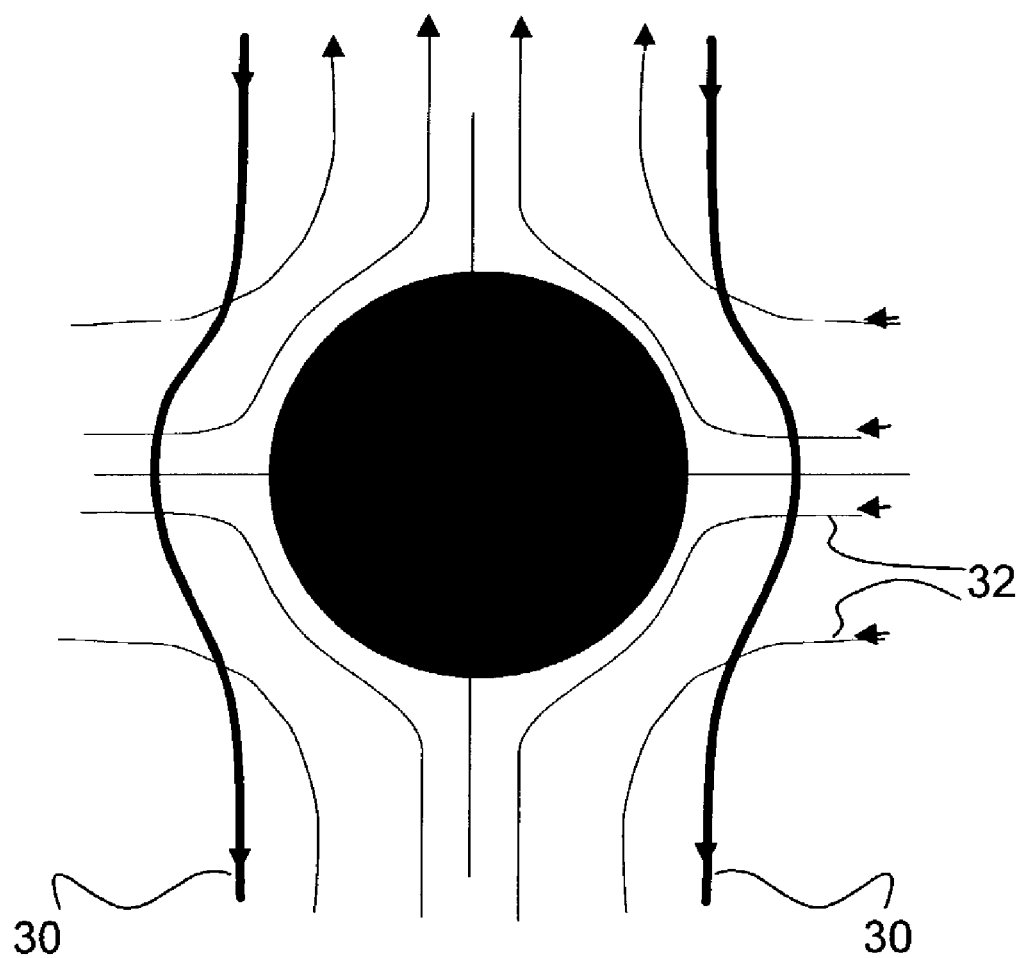
FIG. 7 depicts the streamlines of the main filtration flow together with the acoustic streaming around a sphere in an infinite fluid.

FIG. 7 depicts the streamlines of the main filtration flow 30 together with the acoustic streaming 32 around a sphere in an infinite fluid.

We can see from Eqs. (4) and (5) that the streaming velocity decays very quickly with distance from the particle. On the other hand, close to the particles, its effect could be considerable, as it would tend to deflect the moving particles toward the deposited particles leaving larger empty spaces between them and thus increasing the porosity of the filter cake.

We now make a rough estimate of the effect of acoustic streaming on the motion of an aerosol particle by comparing it with the filtration velocity.

Figure 8:
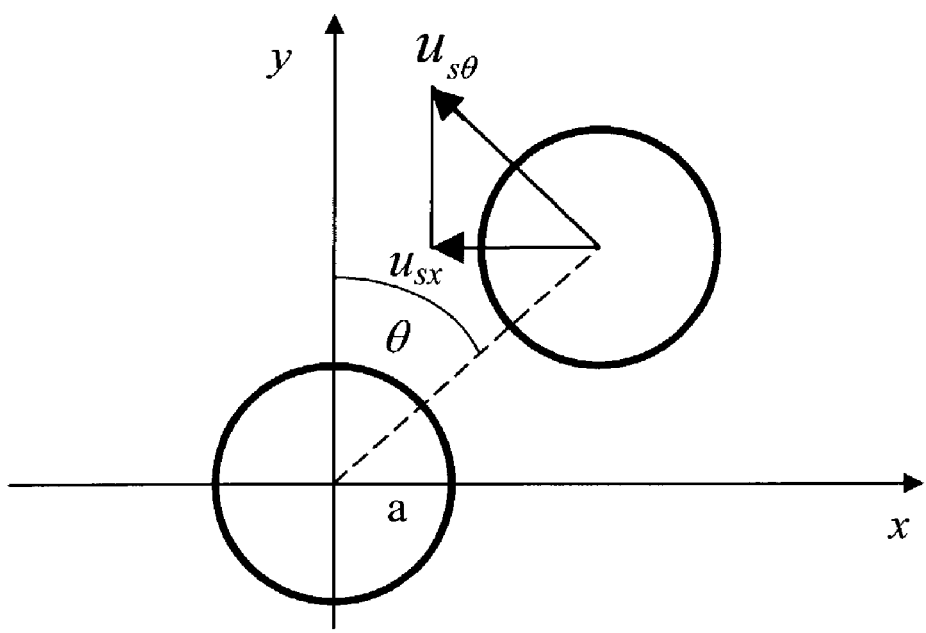
FIG. 8 illustrates a moving particle approaching a particle at rest.

Consider a moving particle approaching a particle at rest, as shown in FIG. 8. If the coordinate system is attached to the center of the static particle, and the moving particle approaches it such, that its center has the radial coordinates (3a, π/4), then, by Eq. (4), it experiences a streaming velocity $$u_{s\theta} = -\frac{45}{32}(\omega a)^{-1} U_a^2 \frac{a^4}{(3a)^4} = -0.0174 \frac{U_a^2}{\omega a} \quad (6)$$

with its x-component $$u_{sx} = u_{s\theta}\cos\theta = -0.0123 \frac{U_a^2}{\omega a} \quad (7)$$

where $\omega=2\pi f$ is the angular frequency and f is the oscillating frequency. The minus sign indicates that the velocity component is in the direction opposite to the x-axis, i.e. toward the particle. Using the fluid displacement, $\Delta s=U_a/\omega$ Eq. (7) can be rewritten as $$u_{sx} = -0.0123\frac{\omega}{a}(\Delta s)^2 = -0.0123\frac{2\pi f}{a}(\Delta s)^2 = -0.0772\frac{f}{a}(\Delta s)^2 \quad (8)$$

Equation (8) provides an expression for the x-component of the acoustic streaming of the fluid around a particle of radius a in terms the acoustic frequency and fluid displacement.

A numerical example follows.

Consider a stationary particle with a diameter of 1 μm subjected to air flowing toward it with a filtration velocity of 1 m/min, in the presence of a 600 Hz and 115 dB acoustic field. Such a field generates a fluid displacement of $\Delta s = 10^{-3}$ cm.

Substitution of the data into Eq. (8) yields the x-component of the acoustic streaming velocity:

$$u_{sx} = -0.0772\frac{f}{a}(\Delta s)^2 = -0.0772 \times \frac{10^3}{0.5 \times 10^{-4}}(10^{-3})^2 = -1.54 \, \text{cm/s}$$

The filtration velocity, $U_f = 1$ m/min=1.7 cm/s, is of the same order as the x-component of the acoustic streaming. Hence, a 1 μm particle, which approaches a similar stationary particle, will be deflected toward it.

The acoustic field tends to move the approaching particles toward other particles on the filter surface, rather than toward the empty spaces between the particles, thus modifying the morphology of the filter cake.

It should be clear that the description of the embodiments and attached Figures set forth in this specification serves only for a better understanding of the invention, without limiting its scope as covered by the following Claims or their equivalents.

It should also be clear that a person skilled in the art, after reading the present specification could make adjustments or amendments to the attached Figures and above described embodiments that would still be covered by the following Claims or their equivalents.

The invention claimed is:

1. A method for slowing down the increase in pressure drop across a gas filter caused by clogging as a result of contaminant particles layer being formed on the filter, the method comprising applying acoustic waves from an acoustic wave source to a gas flowing into the filter, wherein said acoustic wave is applied such that said gas be acoustically excited as it reaches the filter and steady secondary acoustic streaming is produced around each said contaminant particle already deposited on the filter;

thereby increasing the porosity of the contaminant particles layer on the filter, and reducing the pressure drop across the filter.

2. The method of claim 1, wherein the acoustic waves are of subsonic frequency.

3. The method of claim 1, wherein the acoustic waves are emitted in the frequency range of 10 Hz to 10 kHz and with acoustic pressure in the range of 90 dB to 140 dB proximally to the filter surface.

4. The method of claim 1, wherein the acoustic waves are emitted in the frequency range of 10 Hz to 300 Hz.

5. The method of claim 1, wherein the acoustic waves are emitted in the frequency range of 10 Hz to 600 Hz.

6. An apparatus for slowing down the increase in pressure drop across a gas filter caused by clogging as a result of a contaminant particles layer being formed on the filter, the apparatus comprising:

an acoustic wave source positioned so as to emit acoustic waves into gas flowing towards the filter, for applying acoustic waves to the gas flowing into the filter wherein said acoustic wave is applied such that said gas be acoustically excited as it reaches the filter and steady secondary acoustic is produced around each said contaminant particle already deposited on the filter;

thereby increasing the porosity of the contaminant particles layer on the filter, and reducing the pressure drop across the filter.

7. The apparatus of claim 6, wherein said acoustic wave source comprises:

an acoustic wave generator for generating acoustic waves;
an amplifier for amplifying the waves;
a loudspeaker emitting the amplified waves to the gas flowing into the filter.

8. The apparatus of claim 6, wherein the acoustic waves are of subsonic frequency.

9. The apparatus of claim 6, wherein the acoustic wave source generates acoustic frequencies in the range of 10 Hz to 10 kHz with generated acoustic pressure in the range of 90 dB to 140 dB.

* * * * *